United States Patent Office 3,337,391
Patented Aug. 22, 1967

3,337,391
BONDING SILICEOUS MATERIALS TO ORGANIC POLYMERS WITH ORGANIC TITANATES
Robert E. Clayton, John J. Jaruzelski, and Byron M. Vanderbilt, Westfield, N.J., assignors to Esso Research and Engineering Company, a corporation of Delaware
No Drawing. Filed Dec. 24, 1963, Ser. No. 333,202
10 Claims. (Cl. 161—170)

This invention relates to organic polymers bonded to inorganic solids and the methods for effecting such bond. It also relates to composite articles comprising organic polymers and glasses permanently bonded to each other and to a method for making such articles.

In accordance with the invention the surface of a siliceous solid is coated with an organic titanium compound. An organic polymer is then cured in contact with the coated surface. The product comprises polymer and siliceous solid permanently bonded to each other.

Siliceous solids suitable for use in the present invention include glass fibers, glass flakes, glass plates, ceramics, porcelain, quartz, siliceous pigments, silicate pigments and the like, as well as mixtures thereof.

A wide variety of substantially non-volatile organic solvent-soluble organic derivatives of titanium are useful as bonding agents in this invention. For example, an organic titanium compound may be used which has the following structure:

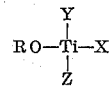

wherein R is an alkenyl group, or an alkyl, aralkyl, or aryl group in which one or more of the hydrogen atoms therein is replaced by a reactive group such as amino, mercapto, cyano, hydroxy, epoxy, or quinone; X is a group which is capable of reacting with the siliceous surface, such as a halogen, hydroxy or ester group; and Y and Z are independently the same as X, the same as OR, or an alkoxy group. Specific compounds suitable in practicing this invention include tetraallyl titanate, hydroxytitanium methacrylate, triethanolamine titanate-N-oleate, isopropoxy titanium acrylate, etc. These compounds may be prepared by following the teachings of the Boswitch patent, No. 2,643,362, or Haslam patent, No. 2,708,205, or by any similar processes known to the art.

Another useful class of titanium compounds are those having the structure:

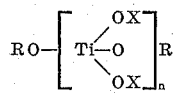

where $n$ is an integer of 1 to 10, R is an alkyl group containing 3 to 10 carbon atoms and X is an unsaturated group such as alkenyl or an unsaturated acyl group.

Specific compounds suitable for practicing this invention include diisopropyl di(2,2-diallyloxymethyl butyl) titanate; poly(diisopropyl dimethacrylyl) titanate. These compounds may be prepared by reacting polyalkyl titanates with organic alcohols or acids.

In the practice of the invention the organic titanate is applied as a coating to the solid which is to be bonded to the organic polymer. The material may be applied alone or admixed with a solvent such as benzene. Solutions which contain 0.5 to 15% by weight of the titanate are particularly satisfactory, Such solutions are readily spread over the glass surface by conventional methods such as spraying, brushing, or dipping. The solvent is then volatilized and the coating is allowed to dry as in air. The thickness of the coating is not critical. However, thin coatings are generally preferred.

Organic polymers which are bonded with the above described coatings include elastomers such as natural rubber; synthetic rubbers such as isobutylene-isoprene copolymers, chlorinated or brominated isobutylene-isoprene copolymers, rubbery copolymers based on ethylene and propylene, synthetic polyisoprenes, polybutadienes, butadiene-acrylonitrile copolymers, butadiene-styrene copolymers, polychloroprene, polyurethane, and the like, and mixtures thereof; and thermosettable resins, such as polyesters of dibasic acids and dihydric alcohols, polydiolefins, such as liquid polybutadiene, liquid copolymers of butadiene and styrene, epoxy resins, phenolic resins, and the like, in which the 1,2 type of unsaturation predominates. In practice the organic polymer may be compounded with conventional fillers and vulcanizing agents. The following specific examples are given by way of illustration and not limitation. Parts and percentages throughout the specification and claims are expressed on a weight basis unless stated otherwise.

Example 1

A mixture of 214 g. of diallyl ether of trimethylolpropane (2,2-diallyloxymethyl-butanol-1) and 142 g. of triisopropyl titanate was heated, and isopropyl alcohol was being continuously distilled off from the reactor. The resulting product, a mixed titanate ester, was heated to 240° C. until no further distillate came off. The residual oil was then heated under vacuum to 240° C. and 50 g. of tetraisopropyltitanate was distilled off. The remaining viscous oil was the desired diisopropyl di(2,2-diallyloxymethyl butyl) titanate. The material analyzed 7.46% Ti (calcd. 8.02).

Example 2

To a flask equipped with a magnetic stirrer 69 g. of tetraisopropyl titanate and 42 g. of methacrylic acid were added at 25° C. The mixture was stirred for 24 hours and stripped under higher vacuum at ambient temperature. The stripped residue amounted to 35.4 g. The residue had an acid number of 37.0. This indicates free methacrylic acid content of about 5.6%. The residual oil was diisopropyl dimethacrylyl titanates of about 94% purity.

The material had a titanium content of 15.4% (calc. for the compound 14.3%). The higher titanium content indicates some condensation according to the formula:

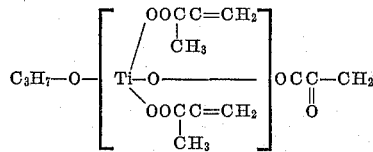

Example 3

A 1% solution of diisopropyl di(2,2-diallyloxy methyl-butyl)titanate of Example 1 in toluene was prepared. The solution (A) was used to treat finely ground silica filler (95% through 270 mesh) using the ratio of 1.15 g. of the solution per gram of filler. The filler was stirred for 30 minutes with the solution, then filtered and dried under vacuum (300 mm. Hg) overnight at 90° F. The treated and dried filler was compounded with resins into thermosetting molding compounds as described in Example 4.

In a similar manner the silica filler was treated with diisopropyl dimethacrylyl titanate (B) of Example 2. This filler was also incorporated into molding compounds.

Example 4

The treated silicas described in Example 3 were compounded with unsaturated polyester resin and molded into test specimens to determine the effect of the titanate on the mechanical properties of the polyester moldings.

|  | Parts by weight | | |
| --- | --- | --- | --- |
| Polyester resin (unsaturated)[1] | 150.0 | 150.0 | 150.0 |
| Benzoyl peroxide | 0.98 | 0.98 | 0.98 |
| Filler description | Untreated | Treated w/A Ex. 3 | Treated w/B Ex. 3 |
| Amount | 350.0 | 350.0 | 350.0 |
| Cured 20 min. at 240° F.: | | | |
| Hardness (Barcol) | 81 | 81 | 81 |
| Flexural Strength, p.s.i. ×10⁻³ | 8.89 | 9.63 | 9.75 |
| Postcured 1 hr. at 350° F.: | | | |
| Flexural Strength, p.s.i. ×10⁻³ | 10.20 | 10.57 | 11.14 |
| Percent change from the untreated material: | | | |
| Cured |  | 9 | 10 |
| Postcured |  | 4 | 9 |

[1] The polyester resin used was a condensate of maleic and phthalic anhydrides with 1,3-propane diol which contained about 30% of styrene.

The treatment affords an improvement in the flexural strength of the polyesters of the order of 10%.

*Example 5*

Silica filler (270 mesh) was treated with the titanates as prepared in Examples 1 and 2. The resulting treated silicas were used in the preparation of molding compounds in accordance with the following formulation:

|  | Untreated filler, parts | Treated with (A), parts | Treated with (B), parts |
| --- | --- | --- | --- |
| Polymer [1] | 60.0 | 60.0 | 60.0 |
| Vinyl toluene | 40.0 | 40.0 | 40.0 |
| Divinylbenzene (52%) | 5.0 | 5.0 | 5.0 |
| Ditertiarybutyl peroxide | 3.5 | 3.5 | 3.5 |
| Silica filler (270 mesh) | 255.0 | 255.0 | 255.0 |

[1] Liquid copolymer of butadiene-1,3 and styrene having a viscosity of 4,000–5,000 poise, prepared by sodium polymerization (Buton).

The resulting specimens were cured 10 minutes at 370° F. with the following results.

|  | Untreated filler | Treated with (A) | Treated with (B) |
| --- | --- | --- | --- |
| Hardness Barcol | 72 | 74 | 76 |
| Flexural Strength, p.s.i. ×10⁻³ | 4.00 | 8.80 | 9.02 |
| Flexural Strength, increase percent |  | 110 | 125 |

The above data show that the treatment of the silica results in doubling the strength of the polymer silica moldings.

*Example 6*

Heat cleaned glass cloth of HG–28 weave (a close mesh taffeta weave) was immersed for about 15 minutes in a 1 wt. percent solution of tetra-allyl-titanate in anhydrous normal heptane. The glass was then placed in a vacuum box and evacuated to 5 mm. Hg to remove the heptane.

Samples of the treated cloth were sandwiched between two layers about 0.095 in. thick of the following rubber composition.

|  | C | D |
| --- | --- | --- |
| Paracril C [a] | 100 |  |
| Neoprene W [b] |  | 100 |
| Semi-reinforcing Furnace Black | 50 |  |
| Fine Thermal Black |  | 50 |
| Magnesium Oxide | 3 | 4 |
| Stearic Acid | 1 | 0.5 |
| Aminox [c] | 0.5 | 0.5 |
| Zinc Oxide | 5 | 5 |
| Dibutyl Phthalate | 15 | 10 |
| Sulfur | 1 |  |
| Tetramethyl Thiuram Monosulfide | 0.6 |  |

[a] A copolymer having the following composition: Butadiene, 65%; Acrylonitrile, 35%. Mooney viscosity (ML, 2 min. at 212° F.), 85.
[b] Polymer of 2-chlorobutadiene, 1,3. Mooney viscosity (ML, 2½ min. at 212° F.), 48.
[c] A low temperature reaction product of diphenylamine and acetone.

This assembly was in turn sandwiched between two layers of canvas for the purpose of backing; i.e., so that the rubber composition is strengthened such that it can be severly tugged in the test to determine the force necessary to pull the rubber away from the glass. A piece of Mylar (film of polyethylene trephthalate resin) was inserted at one end of the sample between the rubber and fabric to provide an opening for the start of subsequent test. For control purposes, identical sets of samples were prepared except that the heat cleaned HG–28 glass was not treated with the titanium compound. The samples were press cured at 307° F. for the times shown below at a pressure of 500 p.s.i.g. on the mold. A one-inch wide specimen was then died out of the sample for a strip adhesion test, which was run on an Instron tester at a jaw separation rate of 2 inches per minute with the following results:

| Glass Treatment | Rubber Composition | Minutes Of Cure | Adhesion, Lbs. Pull/Inch |
| --- | --- | --- | --- |
| Titanate | C | 15 | 9 |
| Do | D | 60 | 7 |
| None | C | 15 | 2 |
| Do | D | 60 | 2 |

This example shows that the glass which had been treated with tetraallyl titanate adhered 4½ fold stronger to nitrile rubber and 3½ fold stronger to neoprene as compared to glass that did not contain the titanate.

*Example 7*

Distyryl diisopropyl titanate is prepared by mixing phenylacetaldehyde with tetraisopropyl titanate in a round bottomed flask equipped with a fractionating column and distilling off the evolved isopropyl alcohol. The exchange reaction proceeds smoothly at about 90° C., and is terminated when the calculated amount of isopropanol is removed. The crude distyryl diisopropyl titanate is used to treat glass cloth, as described in Example 6, and the treated cloth is adhered to an acrylonitrile-butadiene rubber (Paracril C). The improvement of adhesion over untreated cloth is in excess of about 200%.

*Example 8*

A mixture of 1 mole of tetramonochloroethyl titanate and 2 moles of 2,2-diallyloxymethyl-butanol-1 are placed in a distillation assembly and heated until 2 moles of chloroethanol are distilled off. The resulting product, bis-chloroethyl - bis - (2,2 - diallyloxymethylbutyl) titanate is used in treating finely ground silica filler. The filler is heated with a 1% solution in toluene of the mixed titanate. Specimens that are prepared from the treated silica filler and a resin described in Example 5 have a higher flexural strength than those prepared with the filler which is not treated.

Example 9

Titanium lactate (1 mole)

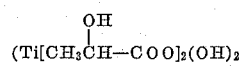

is treated with 1 mole of 2,2-diallyloxymethyl-butanol-1 and lactic acid is removed by distillation. The viscous product, which contains allyloxy groups, is used in treating siliceous fillers. The treated fillers are combined with a hydrocarbon resin from Example 5 and are molded into test specimens and show strength approximately 65% better than the specimens that are prepared with the filler which is not treated.

Example 10

Tetraallyltitanate (1 mole) is blended with 2 moles of octylene glycol (2 - ethyl-hexanediol - 1,3) in a flask equipped with fractionating column. The mixture which warmed up on blending the component is stripped under vacuum from allyl alcohol which is liberated. The mixed, partially polymeric, viscous allyl octylene glycol titanate is used in treating silica filler. A 4% solution of the mixed titanate in toluene is employed in treating silica filler at a ratio of 0.75 g. of the solute per 100 gms. of filler. The treated filler is compounded with Buton resin mix (Example 5). Specimens are cured from the molding compositions and show higher strength than those prepared with the untreated silica filler.

The nature of the present invention having been thus fully set forth, what is claimed as new and useful and desired to be secured by Letters Patent is:

1. A laminated structure comprising glass fibers coated with a layer of tetra-allyl-titanate and bonded to a copolymer of 65% of butadiene and 35% of acrylonitrile having a Mooney viscosity (ML, 2 minutes at 212° F.) of 85, said laminate being cured for fifteen minutes to an hour at 307° F. under pressure.

2. A laminated structure comprising glass fibers coated with a layer of tetra-allyl-titanate and bonded to a polymer of 2-chlorobutadiene-1,3 having a Mooney viscosity (ML, 2.5 minutes at 212° F.) of 48, said laminate being cured for fifteen minutes to an hour at 307° F. under pressure.

3. A laminated structure comprising glass fibers coated with a layer of distyryl diisopropyl titanate and bonded to a polymer of 65% of butadiene and 35% of acrylonitrile and having a Mooney viscosity (ML, 2 minutes at 212° F.) of 85, said laminate being cured for fifteen minutes to one hour at 307° F.

4. A structure comprising silica coated with a layer of diisopropyl dimethacrylyl titanate and bonded to a liquid copolymer of butadiene-1,3 and styrene having a viscosity of 4000 to 5000 poises which structure has been cured for ten minutes at 370° F.

5. A structure comprising silica coated with a layer of diisopropyl di(2,2-diallyl-oxymethylbutyl) titanate and bonded to a liquid copolymer of butadiene-1,3 and styrene having a viscosity of 4000 to 5000 poises, which structure has been cured for ten minutes at 370° F.

6. The method of bonding a liquid copolymer of butadiene-1,3 and styrene having a viscosity of 4000 to 5000 poises to silica which comprises applying to the surface of the silica a coating of diisopropyl-di(2,2-diallyloxymethyl-butyl) titanate and then bonding the liquid copolymer to the thus-coated silica.

7. The method of bonding a liquid copolymer of butadiene-1,3 and styrene having a viscosity of 4000 to 5000 poises to silica which comprises applying to the surface of the silica a coating of diisopropyl dimethacrylyl titanate and then bonding the liquid copolymer to the thus-coated silicia.

8. The method of bonding a copolymer of 65% butadiene and 35% acrylonitrile, having a Mooney viscosity (ML, 2 minutes at 212° F.) of 85 to silica which comprises applying to the surface of the silica a coating of tetra-allyl titanate and then bonding the copolymer to the thus-coated silica.

9. The method of bonding a polymer of 2-chlorobutadiene-1,3 having a Mooney viscosity (ML, 2.5 minutes at 212° F.) of 48 to silica which comprises applying to the surface of the silica a coating of tetra-allyl titanate and then bonding the copolymer to the thus-coated silica.

10. The method of bonding a polymer of 65% butadiene and 35% acrylonitrile, having a Mooney viscosity (ML, 2 minutes at 212° F.) of 85 to silica which comprises applying to the surface of the silica a coating of distyryl diisopropyl titanate and then bonding the copolymer to the thus-coated silica.

References Cited

UNITED STATES PATENTS 2,710,267    6/1955    Boyd _____ 117—124

FOREIGN PATENTS 813,601    5/1959    Great Britain.

ALEXANDER WYMAN, *Primary Examiner.*

R. H. CRISS, *Assistant Examiner.*